(No Model.) 4 Sheets—Sheet 1.
W. W. WETMORE.
MAGAZINE FIREARM.

No. 548,410. Patented Oct. 22, 1895.

Witnesses:
J. H. Shumway
Lillian D. Kelsey

William W. Wetmore
Inventor
By Attys Earle & Seymour (No Model.) 4 Sheets—Sheet 2.
W. W. WETMORE.
MAGAZINE FIREARM.
No. 548,410. Patented Oct. 22, 1895.
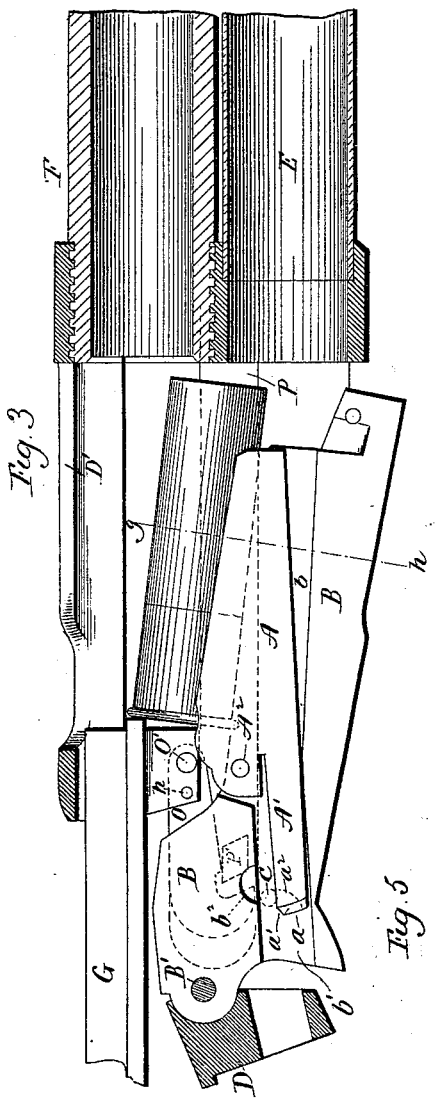
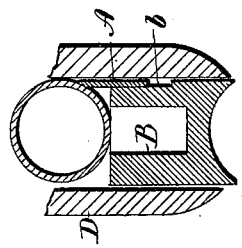
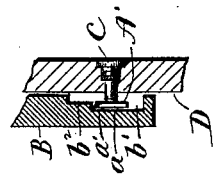
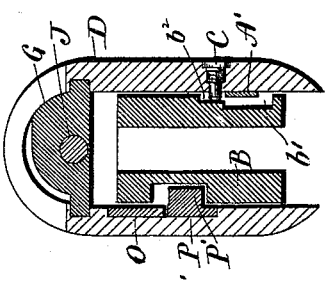
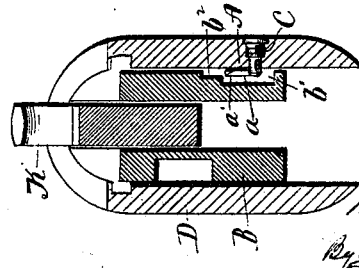

(No Model.) 4 Sheets—Sheet 3.
W. W. WETMORE.
MAGAZINE FIREARM.
No. 548,410. Patented Oct. 22, 1895.
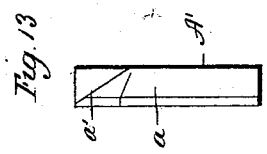
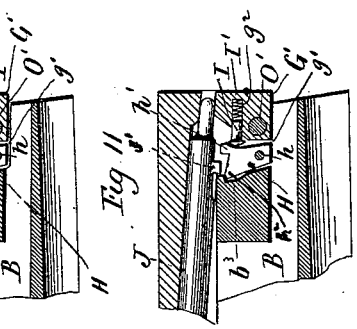
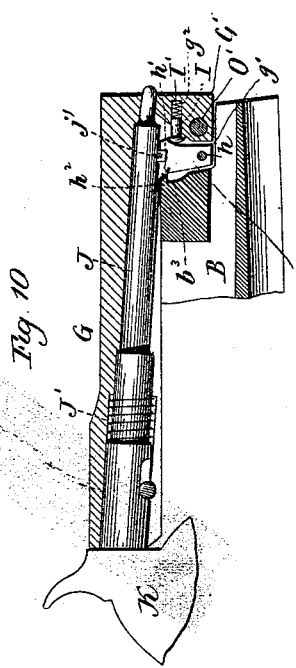
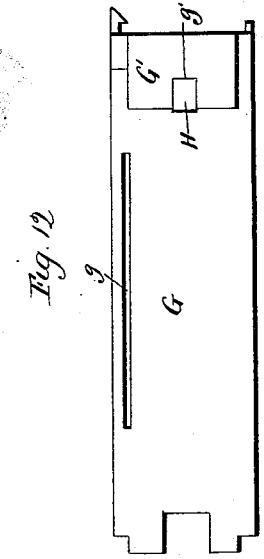
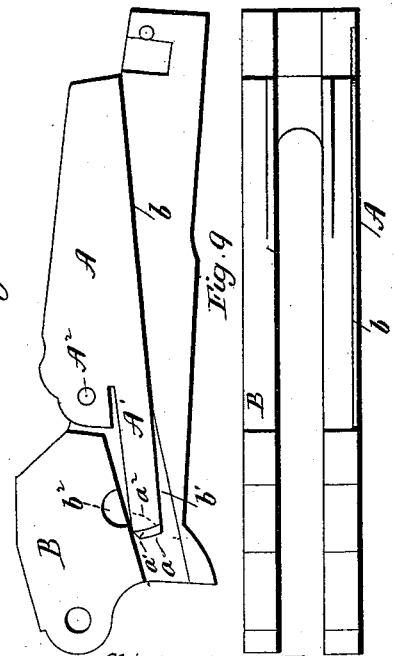

(No Model.) W. W. WETMORE.
MAGAZINE FIREARM.
No. 548,410. Patented Oct. 22, 1895.
Fig. 14
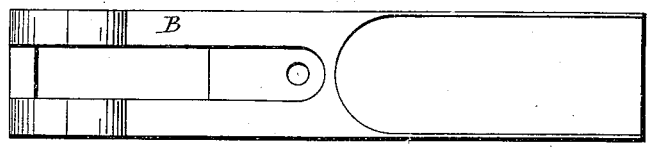
Fig. 15
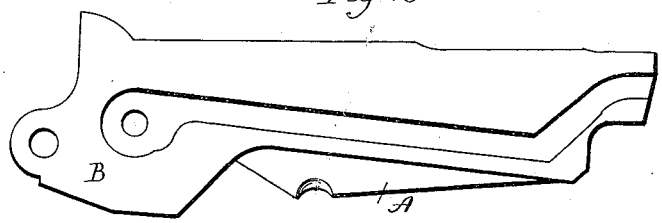
Fig. 13ª
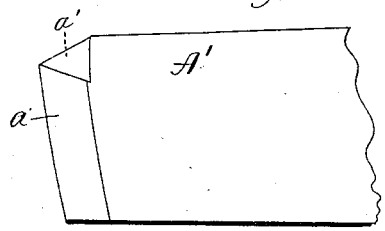

United States Patent Office.

WILLIAM W. WETMORE, OF NEW HAVEN, CONNECTICUT, ASSIGNOR TO THE WINCHESTER REPEATING ARMS COMPANY, OF SAME PLACE.

MAGAZINE-FIREARM.

SPECIFICATION forming part of Letters Patent No. 548,410, dated October 22, 1895.

Application filed December 31, 1894. Serial No. 533,430. (No model.)

*To all whom it may concern:*

Be it known that I, WILLIAM W. WETMORE, of New Haven, in the county of New Haven and State of Connecticut, have invented a new Improvement in Magazine-Firearms; and I do hereby declare the following, when taken in connection with the accompanying drawings and the letters of reference marked thereon, to be a full, clear, and exact description of the same, and which said drawings constitute part of this specification, and represent, in—

Figure 1:
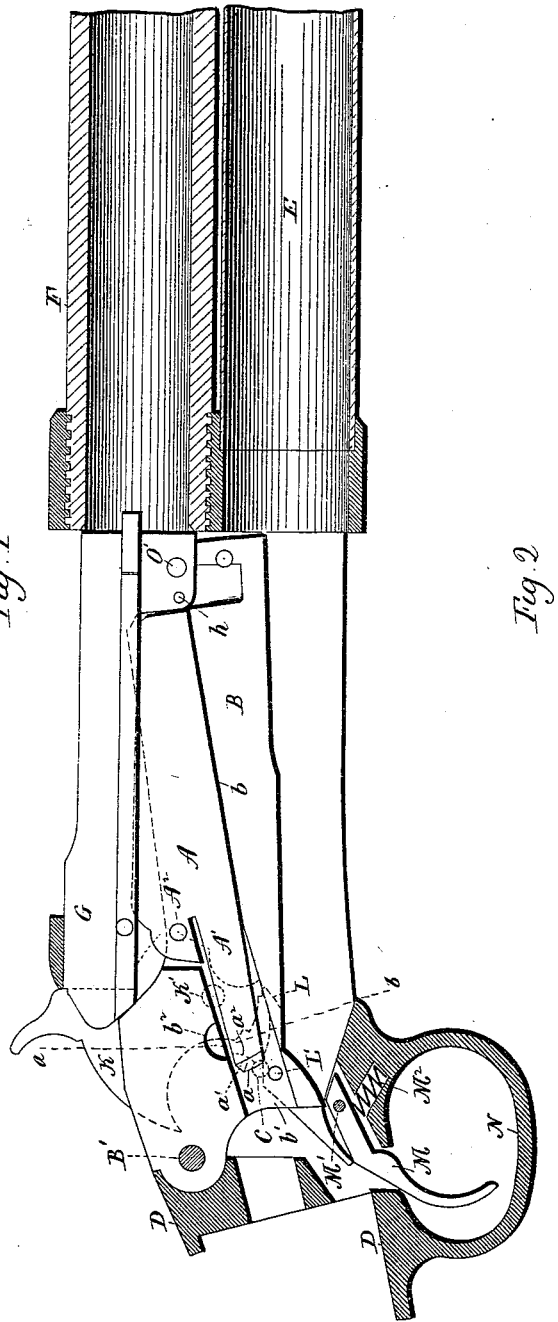
Figure 2:
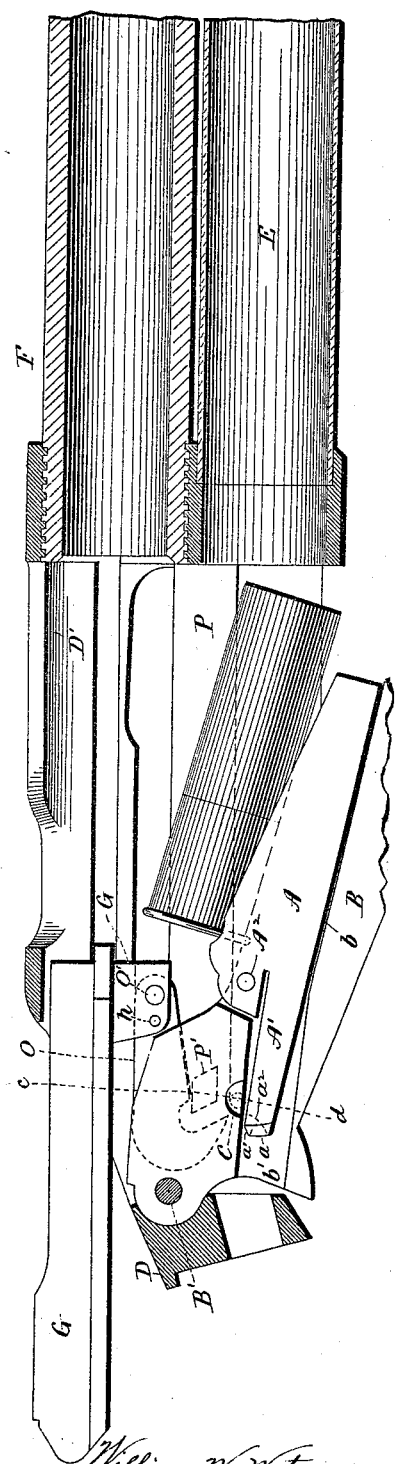

Figure 1, a broken view, partly in elevation and partly in section, of a magazine-gun constructed in accordance with my invention, taken from the right-hand side thereof and showing the gun closed; Fig. 2, a similar view showing the gun open; Fig. 3, a similar view showing the gun partly open and designed to illustrate the lifting action of the cartridge-guide in advance of the lifting of the carrier; Fig. 4, a view of the gun in transverse section on the line $a\ b$ of Fig. 1; Fig. 5, a similar view on the line $c\ d$ of Fig. 2; Fig. 6, a partial broken view in vertical section, showing that portion of the receiver in which the operating screw or pin is mounted, a portion of the carrier and the extreme rear end of the spring-finger of the cartridge-guide, which is pivoted to the carrier; Fig. 7, a view on the line $g\ h$ of Fig. 3; Fig. 8, a detached view in side elevation of the carrier and cartridge-guide; Fig. 9, a detached plan view of the carrier with the guide removed and the carrier otherwise stripped; Fig. 10, a broken view in vertical section through the breech-bolt and the forward end of the carrier to illustrate the locking-dog which is shown in its unlocked position; Fig. 11, a less comprehensive view showing the locking-dog in its locked position in which it holds the carrier closed; Fig. 12, a detached reverse plan view of the breech-bolt; Fig. 13, a greatly-enlarged end view of the spring-operating finger of the cartridge-guide; Fig. 13ª, a broken view thereof, in side elevation, on the same scale; Fig. 14, a detached plan view of the carrier; Fig. 15, a detached view thereof, in side elevation, showing the groove receiving the lug formed on the rear end of the action-bar.

My invention relates to an improvement in magazine-firearms, the object being to produce a simple, compact, durable, and effective arm constructed with particular reference to providing against the displacement of the cartridges upon the carrier while they are being transferred from the magazine to the gun-barrel, and also with particular reference to avoiding the indentation of the primers of the cartridges as well as the firing of the cartridges when the gun is being closed rapidly and to prevent the opening of the gun until after it has been fired or the firing-pin has been pushed forward.

With these ends in view my invention consists, first, in a pivotal cartridge-guide and a stationary screw or pin for coacting with the same, and, second, in a spring-actuated locking-dog mounted in the forward end of the breech-bolt and coacting with the firing-pin, and engaging with the carrier to hold the same in its closed position until after the gun has been fired or the firing-pin has been pushed forward.

My invention further consists in certain details of construction and combinations of parts, as will be hereinafter described, and pointed out in the claims.

My improved cartridge-guide, as herein shown, is composed of a thin flat plate or blade A, of sheet metal, having a forwardly-inclined or beveled upper edge and a straight lower edge, and therefore narrower at its forward than at its rear end, which latter is constructed with an integrally-formed rearwardly-extending spring-operating finger A', the lower edge of which is coincident with the straight lower edge of the plate or blade. The outer face of the extreme rear of the outer end of this finger is constructed with a beveled operating-face $a$, and with a corresponding, but smaller, operating-face $a'$, which I shall hereinafter speak of as the "corner" bevel, to distinguish it from the bevel $a$, which I shall speak of as the "end" bevel. These two bevels are well shown in Fig. 13 of the drawings, which represents them greatly enlarged. The said plate is located in a shallow recess $b$, formed to recive it in the right-hand side of the carrier B, and in its main portion corresponding in depth to the thickness of the guide, the outer face of which is, therefore, flush with the face of the said side of the carrier, but the rear portion $b'$ of the recess $b$ is made deeper and so as to exceed in depth the thickness of the said spring-operating finger $A'$, as clearly shown in Figs. 4, 5, and 6, and thus permits the finger to have a transverse movement. The guide is hung upon a pin $A^2$, at its rear end, mounted in the carrier and located in the recess $b$. For the purpose of operating the guide I employ a fixed horizontally-arranged screw C, mounted in the right-hand side wall of the frame D in position for the engagement of its pointed inner end with the upper edge of the rear end of the finger $A'$, with the outer face of the rear end of the said finger, and with the end and corner bevels $a$ and $a'$ thereof. By the term "receiver," as used above, I mean to indicate that portion of the frame of the gun which contains the action mechanism thereof. The said screw is clearly shown by full lines in Figs. 4, 5, and 6, and by broken lines in Figs. 1, 2, and 3. A small clearance-space $b^2$, leading out of the upper wall of the rear portion $b'$ of the recess $b$, formed in the carrier to receive the cartridge-guide and its finger, is provided for the clearance of the inner end of the screw C when the carrier is in its open or depressed position, as seen in Figs. 2 and 5.

Having now described the construction and arrangement of the cartridge-guide, I will proceed to set forth the mode of its operation by means of the said screw.

When the carrier is in its closed position, as seen in Fig. 1, the cartridge-guide will be in its elevated position, as seen in the said figure, its straight lower edge being engaged with the lower edge wall of the recess $b$, while the pointed end of the screw C will be engaged with the lower portion of the end bevel $a$ of the spring-operating finger $A'$ of the guide, as clearly shown in Fig. 4. Now when the gun is opened and the carrier is thrown down into its open position, as seen in Fig. 2, the end bevel $a$ is forced under the screw, whereby the spring-operating finger $A'$ is forced inwardly to the bottom of the portion $b'$ of the recess $b$, as seen in Fig. 6. Then as the carrier and guide continue to move downward the said finger is caused to pass under the point of the screw in a very slightly-curved diagonal path, which is indicated by the broken line $a^2$ in Figs. 2, 3, and 8 of the drawings. Finally, when the carrier and guide are in their full open or depressed positions, the inner end of the screw will stand in the clearance-space $b^2$ in the carrier, as seen in Figs. 2 and 5. It will be more natural, perhaps, to speak of the screw as traveling over the end bevel $a$ of the spring-finger of the guide and diagonally over the outer face of the rear end of the said finger and into the recess, but strictly the screw is stationary in the frame while the carrier and the guide and the spring-finger thereof are in reality the moving parts, the latter moving in a curved path under the point of the screw. Now, when the carrier begins its closing movement the upper edge of the rear end of the spring-finger of the guide will be almost immediately engaged, as seen in Fig. 3, with the under side (not with the point) of the screw, whereby the guide will be turned on its pivot $A^2$, so that its forward end will be lifted faster than the carrier, for the reason that the point of engagement between the spring-finger and screw is considerably forward of the pin $B'$, from which the carrier is suspended in the frame D. It will therefore be understood that as the cartridge-guide rises in advance of the carrier it will act to prevent the cartridge upon the carrier from being displaced on its way from the magazine E to the gun-barrel F, and particularly to prevent it from escaping outward through the ejection-opening $D'$, which is formed in the right-hand side of the frame, as usual in this class of arms. Soon after the guide has been lifted, as described, for the performance of its guiding function its corner bevel $a'$ is presented under the end of the screw, so that the engagement of the spring-finger is transferred from the lower side of the screw to the end thereof. In the further upward movement of the carrier the end bevel $a$ is presented under the point of the screw, and drawn under the same until when the carrier reaches its full-closed position the guide is brought to a stop, with the lower portion of its end bevel in engagement with the point of the screw, as shown, for instance, in Figs. 1 and 4. The guide is brought to a stop, as stated, by the entrance of its upper edge into a long, narrow, longitudinally-arranged groove $g$, formed in the lower face of the right-hand edge of the sliding breech-block G, as seen in Fig. 12. Then when the gun is opened the same co-action between the spring-finger and screw is repeated, and so on. I might, in further explanation, say that the end of the spring-finger travels in an irregular circular path around the screw, or, assuming the screw to travel instead of the finger, it would be said that it passed from the lower end of the end bevel diagonally forward over the outer face of the end of the spring-finger on the broken line $a^2$ into the clearance-space $b^2$, and then rode rearward over the upper edge of the rear end of the finger, and then returned to its normal position over the corner bevel $a'$, and the upper portion of the end bevel $a$. I thus provide, by means of my extremely simple construction of guide and screw, effective means for preventing the displacement or escape of a cartridge while being transferred from the magazine to the gun-barrel.

If desired, the guide might be pivoted to the frame and the stationary screw located in the carrier, or the guide and coacting-screw might be otherwise arranged, so long as the guide is caused to turn on its pivot and prevent the displacement or escape of the cartridges while the same are on the carrier. The screw might be replaced, of course, by a pin or equivalent means, such as a projection, for coacting with the spring-operating-finger of the guide.

The second feature of my invention relates to the locking of the carrier in its closed position, and is designed to prevent the indentation of the primers of the cartridges, as well as the firing of the cartridges, when the gun is being closed rapidly, and to prevent the opening of the gun until after it has been fired or the firing-pin has been pushed forward. In carrying out this feature of my invention I employ a locking-dog H, Figs. 10, 11, and 12, which is located in a downwardly and rearwardly-opening recess $g'$, formed in the depending shoulder $G'$, situated at the forward end of the breech-bolt G, the dog being pivotally mounted upon a horizontal pin $h$, passing through its lower end, and itself mounted in the said shoulder $G'$ of the breech-bolt. A small plunger I and a spiral spring $I'$, located in a horizontal counter bore $g^2$, formed in the shoulder $G'$, exert a constant effort to throw the upper end of the dog rearward, the said end of the dog being furnished with a lug $h'$, coacting with a corresponding depending lug $j'$, depending from the lower face of the forward end of the firing-pin J, mounted, as clearly shown in Figs. 10 and 11, in the breech-block G. The upper end of the dog is also provided with a nose $h^2$, adapted to take into a locking-notch $b^3$, formed in the forward end of the carrier B. Normally the firing-pin J will be retracted by its spring $J'$, so as to clear its lug $j'$ from the lug $h'$ of the locking-dog and permit the spring $I'$ of the locking-dog to coact with the plunger I to throw the dog rearward into position for its nose $h^2$ to enter the locking-notch $b^3$ in the carrier, whereby the same is maintained in its closed position until the gun is fired or until the firing-pin is pushed forward. When the gun is fired and the firing-pin J is forced forward against the tension of its spring $J'$ by means of the hammer K, its lug $j$ engages with the lug $h'$ of the dog, so as to overcome the tension of the spring $I'$ and rock the dog forward, whereby its nose $h^2$ is cleared from the notch $b^3$ and whereby the carrier is unlocked.

If it is desired to unlock the carrier when the gun is closed without exploding the cartridge, that end may be accomplished by carefully pushing the firing-pin forward by pressing against its rear end with the finger or in some other equivalent manner. I may state in this connection that when the carrier is locked in its closed position by means of the locking-dog the other members of the breech or action mechanism, including the sliding supporting-handle, are also locked, whereby the gun is prevented from accidentally opening—as, for instance, in case it should be stood upright on the butt-end of its stock.

When the gun is being closed very rapidly, the carrier is lifted into its elevated or closed position by a quick movement, which is completed just after the breech-bolt goes into its closed position. As the carrier is being lifted, as described, it will engage at a point just above its notch $b^3$ with the nose $h^2$ of the dog, which will rock forward on its pivot $h$ against the tension of its spring $I'$, which will immediately recover and throw the said nose of the dog rearward into the said notch of the carrier, which is thus locked in its elevated position. It is to be observed, however, that inasmuch as the pivotal dog is mounted in the breech-block and virtually disconnected from the firing-pin and caused to shoot forward to indent the primer or explode the cartridge the same will not be disturbed by the "snapping," so to speak, of the carrier into its closed and locked position.

The two features of invention which I have described are not confined to use with the particular arm shown, but may be employed in any other arm adapted to receive them, and either one or both may be employed, as found desirable.

For the better understanding of the drawings herein I may add that the hammer K is mounted upon a pivot $K'$ and coacts with a sear L, hung upon a pin $L'$ and operated upon by a trigger M, hung upon a pin $M'$, having a trigger-spring $M^2$ and at its lower end extending into the guard N, which depends from the frame D. A hook O, connected with the shoulder $G'$ of the block G by means of a horizontal pin $O'$, couples the said breech-block with the action-bar P, the rear end of which is engaged by the hook and furnished with a stud $P'$, which works in a long groove $B^2$, formed, as shown in Fig. 5, in the left-hand face of the carrier B and inclined in the usual manner, so that the movement of the action-bar back and forth will positively elevate and depress the carrier, as usual in the class of arms in which the carrier is operated by means of a sliding supporting-handle on the magazine.

United States Patent No. 441,390, granted November 25, 1890, to the Winchester Repeating Arms Company on the application of John M. Browning and Matthew S. Browning, may be referred to as showing the described operation of the carrier and breech-block by means of a hook and an action-bar. It will be understood that the said mechanism acts alone in lifting the carrier into its closed position and that it will sustain the same therein provided the sportsman holds the handle at the limit of its forward movement or maintains the gun in such a position that the handle will not slip back and allow the breech mechanism to open. The particular function of my improved locking-dog is to lock the carrier and hence the action mechanism in its closed position, so that it will retain the same without regard to the position of the gun or without requiring the co-operation of the sportsman.

I would have it understood that I do not limit myself to the exact construction shown and described, nor to using the two features of my invention in combination, nor in the arm set forth, but that I hold myself at liberty to make such changes and alterations as fairly fall within the spirit and scope of my invention.

Having fully described my invention, what I claim as new, and desire to secure by Letters Patent, is—

1. In a magazine fire-arm, the combination with the frame thereof, of a carrier pivotally mounted therein, a cartridge-guide pivotally attached to the carrier, and a fixed operating-screw or pin mounted in the frame and coacting with the said guide to operate the same by lifting it in advance of the carrier, substantially as described.

2. In a magazine fire-arm, the combination with the frame thereof, of a carrier mounted therein, a cartridge-guide pivoted thereto and constructed at its rear end with a rearwardly projecting integral spring-finger, and a fixed operating-screw or pin mounted in the frame and coacting with the said spring-finger of the guide to operate the same by lifting it in advance of the carrier, substantially as described.

3. In a magazine fire-arm, the combination with the frame and the carrier thereof, of a cartridge-guide located in a shallow recess formed in the right hand side of the said carrier, and constructed at its rear end with a spring-finger; and a fixed operating-screw or pin mounted in the right hand wall of the frame, and co-acting with the said spring-finger of the guide to operate the same by lifting it in advance of the carrier, substantially as described.

4. In a magazine fire-arm, the combination with the frame and the carrier thereof, of a cartridge-guide pivotally mounted in the right hand side of the carrier, and constructed at its rear end with a spring-finger having a corner bevel and an end bevel, and a screw or pin mounted in the said side of the frame, and co-acting with the rear end of the upper edge of the finger and with the said bevels, substantially as described.

5. In a magazine fire-arm, the combination with a sliding breech-bolt and a pivotal carrier, of a firing-pin located in the breech-bolt, and a spring-actuated locking dog mounted in the breech-bolt and adapted to enter a notch in the carrier for locking the same in its closed position, substantially as described.

6. In a magazine fire-arm, the combination with the breech-bolt thereof, of a firing-pin mounted in the said breech-bolt, and having a lug depending from its forward end, a pivotal carrier, and a spring-actuated locking-dog pivotally mounted in the forward end of the breech-bolt, and constructed at its upper end to co-act with the lug of the pin, and to enter a notch formed in the carrier for locking the same in its closed position, substantially as described.

In testimony whereof I have signed this specification in the presence of two subscribing witnesses.

WILLIAM W. WETMORE.

Witnesses:
DANIEL H. VEADER,
WILLIAM S. BALDWIN.